(12) United States Patent
Wiltshire et al.

(10) Patent No.: US 11,269,105 B2
(45) Date of Patent: Mar. 8, 2022

(54) GENERATING HYDROCARBON CHANCE MAPPING

(71) Applicant: Landmark Graphics Corporation, Houston, TX (US)

(72) Inventors: Marcus David Michael Wiltshire, Wantage (GB); Duncan Charles Hay, Bristol (GB)

(73) Assignee: Landmark Graphics Corporation, Houston, TX (US)

( * ) Notice: Subject to any disclaimer, the term of this patent is extended or adjusted under 35 U.S.C. 154(b) by 61 days.

(21) Appl. No.: 16/805,935

(22) Filed: Mar. 2, 2020

(65) Prior Publication Data

US 2021/0270988 A1    Sep. 2, 2021

(51) Int. Cl.
*G01V 1/50* (2006.01)
*G01V 1/46* (2006.01)

(52) U.S. Cl.
CPC ............ *G01V 1/50* (2013.01); *G01V 1/46* (2013.01); *G01V 2210/74* (2013.01)

(58) Field of Classification Search
CPC ......... G01V 1/50; G01V 1/46; G01V 2210/74
See application file for complete search history.

(56) References Cited

U.S. PATENT DOCUMENTS 8,749,549 B2   10/2014   Hantschel et al.
8,902,221 B2   12/2014   Hantschel et al.
(Continued)

FOREIGN PATENT DOCUMENTS

AU   2012203388 A1   1/2013
AU   2012203388 B2   10/2014
(Continued)

OTHER PUBLICATIONS

Wiltshire, et al.; "Processing Wellbore Data to Determine Subterranean Characteristis"; PCT Application No. PCT/US2019/041660; Jul. 12, 2019; 34 pgs.
(Continued)

*Primary Examiner* — Alexander Satanovsky
*Assistant Examiner* — Lynda Dinh
(74) *Attorney, Agent, or Firm* — Tenley Krueger; Parker Justiss, P.C.

(57) ABSTRACT

This disclosure presents methods and systems to perform fairway analysis on a computing system to automate tasks. The automation of the fairway analysis can reduce bias and uncertainty introduced by a user using their own set of assumptions, estimations, and preferred sequencing of rules and algorithms. The described processes can receive initial input parameters describing the area of interest (AOI) and a geological age range. The processes can retrieve appropriate geological and stratigraphic parameters using the initial input parameters. The combined input parameters can then be geoprocessed using age-aware rules and a determined sequence of algorithms and rules to generate synthesized geological data that can be upscaled and transformed into one or more chance maps indicating the presence and effectiveness of various hydrocarbon elements. The chance maps can be amalgamated and processed to produce a prospective map indicating the likelihood of success of further exploration of the specified AOI.

16 Claims, 5 Drawing Sheets

(56) References Cited

U.S. PATENT DOCUMENTS

| | | | |
|---|---|---|---|
| 10,914,158 B2* | 2/2021 | Otaibi | G06Q 10/0633 |
| 2008/0294393 A1 | 11/2008 | Laake et al. | |
| 2012/0271609 A1* | 10/2012 | Laake | G01V 1/003 |
| | | | 703/10 |
| 2012/0316847 A1 | 12/2012 | Hantschel et al. | |
| 2012/0317478 A1* | 12/2012 | Hantschel | E21B 44/00 |
| | | | 715/255 |
| 2014/0039795 A1* | 2/2014 | Temizel | E21B 49/00 |
| | | | 702/11 |
| 2014/0223351 A1* | 8/2014 | Ross | G06F 3/0484 |
| | | | 715/771 |
| 2018/0031732 A1* | 2/2018 | Mosse | G01V 99/005 |
| 2018/0068037 A1 | 3/2018 | Williams | |
| 2019/0383965 A1* | 12/2019 | Salman | G01V 99/005 |

FOREIGN PATENT DOCUMENTS

| | | |
|---|---|---|
| CA | 2779207 A1 | 12/2012 |
| GB | 2491715 B | 10/2012 |
| GB | 2491715 A | 12/2012 |
| WO | 2019216889 A1 | 11/2019 |

OTHER PUBLICATIONS

Wiltshire, et al.; "Auto-Generated Transgressive Systems Tract Maps"; PCT Application No. PCT/US2019/041227; Jul. 11, 2019; 41 pgs.

* cited by examiner

GENERATING HYDROCARBON CHANCE MAPPING

TECHNICAL FIELD

This application is directed, in general, to creating hydrocarbon chance maps and, more specifically, to systematizing the generation of the chance maps.

BACKGROUND

It is important in the hydrocarbon production industry to locate new reservoirs of hydrocarbons where extraction can be profitable. Exploring areas of interest (AOI) by drilling sample wells can be costly, especially in off shore environments. Conventionally, various types of chance maps and proxy maps are created by a user, such as a geoscientist, to represent a likelihood of success of further exploration of an AOI. These chance maps are subject to user bias, user estimations, and the methodology and sequencing of algorithms and rules applied by the user. This can make comparing chance maps created by different users subject to higher uncertainties. In addition, the time taken by a user to generate a prospective map from the subterranean formation data can take days, weeks, and months depending on the complexity and assumptions made. A more consistent process for developing chance maps and prospective maps would be beneficial to hydrocarbon explorations.

SUMMARY

In one aspect, a method to perform fairway analysis on a computing system is disclosed. In one embodiment, the method includes: (1) geoprocessing received input parameters utilizing a sequence of age-aware rules and a sequence of algorithms to generate synthesized geological data, (2) upscaling the synthesized geological data over a geological age range, and (3) producing a prospective map utilizing the synthesized geological data, wherein the sequence of algorithms utilizes a stratigraphic framework, and the synthesized geological data.

In a second aspect, a system to perform fairway analysis is disclosed. In one embodiment, the system includes: (1) a geological data receiver, capable of receiving input parameters from one or more data sources and one or more user input parameters, and (2) a stratigraphic analyzer, capable of geoprocessing the input parameters using a stratigraphic framework, geological principles, and geological age-aware rules to create synthesized geological data, upscaling the synthesized geological data, and generating one or more chance maps and prospective maps utilizing the synthesized geological data.

In a third aspect, a computer program product having a series of operating instructions stored on a non-transitory computer-readable medium that directs a data processing apparatus when executed thereby to perform fairway analysis operations is disclosed. In one embodiment the operations include: (1) geoprocessing received input parameters utilizing a sequence of age-aware rules and a sequence of algorithms to generate synthesized geological data, (2) upscaling the synthesized geological data over a geological age range, and (3) producing a prospective map utilizing the synthesized geological data, wherein the sequence of algorithms utilizes a stratigraphic framework and the synthesized geological data.

BRIEF DESCRIPTION OF THE DRAWINGS

Reference is now made to the following descriptions taken in conjunction with the accompanying drawings, in which.

DETAILED DESCRIPTION

A key screening workflow in hydrocarbon exploration is the screening of areas of the world for the presence and effectiveness of petroleum system elements, i.e., hydrocarbons, and can include their source, reservoir rocks, and seal rocks, e.g., subterranean formations. The screening workflow can help refine understanding about areas of the globe that have potential for future hydrocarbon production and can be used to help maintain an exploration portfolio. The potential for future hydrocarbon production can be measured using factors such as cost to effect development, cost to achieve production extraction, cost to transport the hydrocarbons produced, the type of hydrocarbons in the reservoir, and other well system development factors. The screening workflow can also allow the focusing of exploration budgets on high potential areas while reducing exploration risk. The screening workflow is typically used in early stages of the hydrocarbon exploration cycle, thereby allowing users to assess hydrocarbon potential on a global to basin scale.

In order to perform the screening workflow, e.g., screening or fairway analysis, a vast amount of geological data is collated, synthesized, and upscaled. In conventional methods, portions of this process are handled by a user to generate chance maps. Chance maps are maps or data sets that represent a prediction of subsurface geological parameters. Chance maps, as used herein, include various kinds of data sets and analysis maps, for example, probability maps, traffic light maps, shared/play-specific probability maps, local/prospect-specific probability maps, risk segment maps, fairway summary maps, and other types of probability and estimation maps.

Users can apply varying sets of rules, assumptions, and values to the geological data. This can lead to results that can be dominated by a user's selected input parameters, limiting the ability to compare and relate different basins to each other or to compare one user's results to another user's results. In some scenarios, the process can take a considerable amount of time to produce (such as days, weeks, or months for one basin). In addition, when the conventional process is performed on a larger scale, it can take years to update a global portfolio, such as when new mineral or chemical property parameters are discovered or developed.

This disclosure presents a process to automate the analysis of the geological data, including upscaling the geological data and interpretations of the geological data into a series of chance maps which can indicate the likelihood of finding a particular hydrocarbon element, i.e., presence of hydrocarbon element, and the effectiveness of the hydrocarbon element. The chance maps can then be amalgamated to produce a combined chance map, e.g., a prospective map, which can provide a summary of the screened elements in a representation, for example, using a two-dimensional (2D) map with symbols or colors indicating the various levels of hydrocarbon potential.

The disclosed processes can utilize user input parameters such as geological age ranges, sub-surface depth ranges of subterranean formations, and parameters indicating the likelihood or cutoff of subterranean formations containing one or more specific hydrocarbon elements in relation to the presence and effectiveness of that location. In some aspects, a machine learning algorithm can be applied that can provide some of the user input parameters (as new input parameters), thereby decreasing uncertainty and removing user bias from the input parameters, e.g., overriding or complementing some of the user received input parameters. The machine learning algorithm can be implemented using a machine learning processor. The disclosed processes can assist users to achieve faster, more consistent exploration decisions during early stages of exploration, thereby lowering the eventual cost per barrel of oil equivalent (BOE) once that area reaches a production state.

The disclosed processes can be automated using a hardware, software, or a combination thereof. For example, the processes can be executed from a dedicated electronic circuit, a programmable electronic circuit (such as a variety of ROM and RAM types), an application, dynamic link library (DLL), module, function, be part of another application, and other types of hardware and software. The hardware and software can be standalone components or be part of another computing system, such as a tablet, smartphone, laptop, server, data center, cloud environment, or other devices.

The disclosed processes, i.e., geoprocessing processes, can operate from a geological age-aware rules base, utilizing multiple geoprocessing algorithms and a set of geological principles. The geoprocessing algorithms can be, for example, various methodologies for interpolating rock types between points of data control and converting these predictions into an appropriate chance map and can utilize various strategic frameworks such as ordered or sequence stratigraphic frameworks, chronostratigraphic frameworks, and lithostratigraphic frameworks.

The algorithms utilized during the geoprocessing process can be selected by a default algorithm set, by user input parameters, or by a machine learning algorithm. For example, the user input parameters can suggest potential algorithms to use, depending on the geological data involved. The geological principles can act as a set of rules that allow a user to make predictions away from data control. This disclosure utilizes algorithms that can apply these geological principles automatically. Sequence stratigraphy is an example application of geological principles as it allows a prediction of rock type distribution based on changes in global sea level. Another example can be erosion and unconformities as this can be used to determine if rocks exposed at the Earth's surface are of a given geological age. For example, it is likely that rocks of a younger age will not be found in a location where extensive erosion has occurred since they would likely have been eroded.

The geoprocessing process can automatically process geological data and generate synthesized geological data, e.g., derived geological data or processed geological data, that has been interpreted within the selected stratigraphic framework. The conventional manual effort of generating chance maps can be eliminated. Using the rules base can reduce user error and bias, leading to results that can be compared with other results with a higher degree of confidence and a lower degree of inconsistent interpretation.

Furthermore, the process can be scaled to deal with any sized area of interest (AOI) or geological age range on a single run, thereby enabling the globe to be rapidly screened and an exploration portfolio continually maintained and updated with every update or new additional content, such as new mineral or chemical parameters. For example, if a technology advance allows the extraction of a hydrocarbon from a certain type of subterranean formation at a lower cost than previously experienced, this information can be applied to the global portfolio using this disclosure to generate an updated exploration portfolio with updated potential and value indicators. The process can be automatically re-run on a schedule, or when new or updated input parameters are available, allowing the chance map and prospective map portfolio to be automatically maintained. A global update to the chance maps and prospective maps can be completed within minutes, rather than the typical months to years.

The synthesized geological data can be further upscaled and used to produce a set of chance maps, which can be utilized to indicate the likelihood of finding a particular hydrocarbon element present and effective in a subterranean formation. The set of chance maps can be amalgamated to produce a prospective map of an area. The chance maps and the prospective map can be represented using data, symbols, colors, or a combination thereof. For example, a green, yellow, red color scheme can be utilized to indicate areas of interest for further exploration. The number of colors, shades, symbols, or other indicators used on the maps can vary. The preferred aspect is to limit the number of value indicators to three to five separate indicators. An increase in the number of indicators can increase the overall uncertainty of the data as estimations and errors can be magnified through the geoprocessing steps.

A user can provide user input parameters to specify screening requirements, which can include but are not limited to, an area of interest, stratigraphic age range, lithologies of interest, and a preferred methodology for chance mapping. Utilizing the user input parameters, the process can receive relevant input parameters from other sources containing subterranean formation data. These data sources can be from one or more databases and data sources, for example, gross depositional environment (GDE) maps, well data, organic geochemistry data, rock property data, depth data, and other data sources and data types.

The geoprocessing steps can use the received input parameters to generate synthesized geological data specific to the location and parameters provided, such as generating individual chance maps for the presence and effectiveness of individual hydrocarbon elements. The chance maps can highlight different data points and take different forms, for example, stacked GDE maps, maturity maps, charge maps, reservoir effectiveness maps, kitchen maps, and other chance map types. These maps can be amalgamated to produce a prospective map of the area, e.g., a fairway map.

Figure 1:
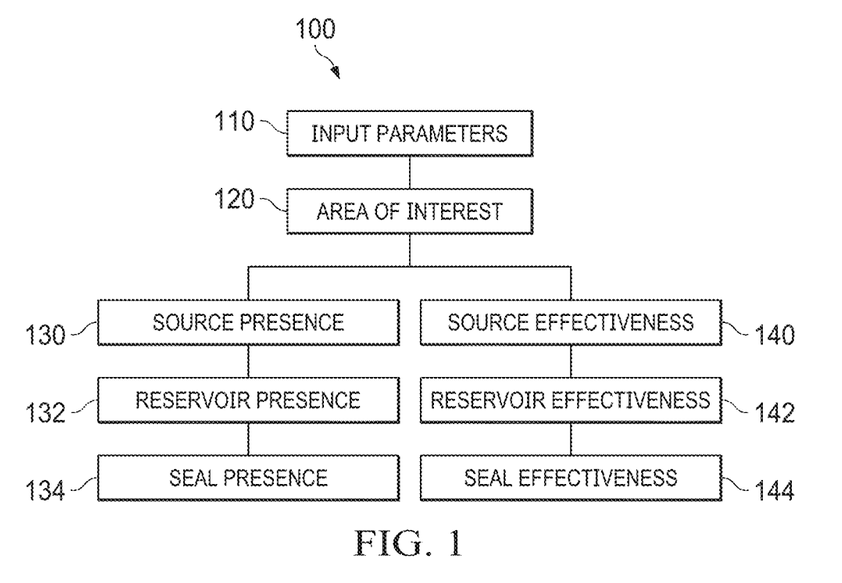
FIG. 1 is an illustration of a block diagram of an example set of input parameters to an automated fairway analysis system.
Figure 4:
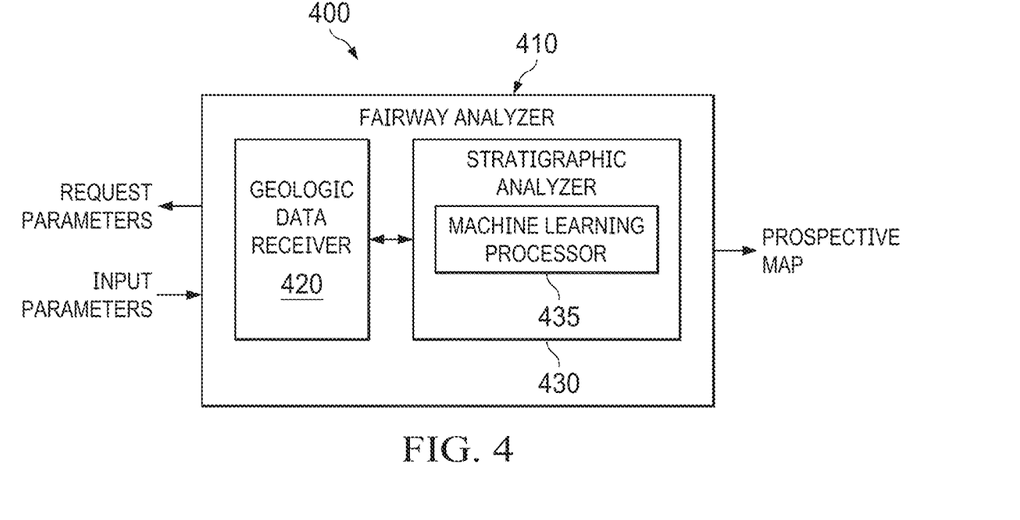
FIG. 4 is an illustration of a block diagram of an example fairway analysis system.

Turning now to the figures, FIG. 1 is an illustration of a block diagram of an example set of input parameters 100 to an automated fairway analysis system, such as fairway analysis system 400 in FIG. 4. A user can determine the variable input parameters, such as a geological time period, or age range, and an AOI. In some aspects, additional input parameters can be supplied, such as parameter and cutoff values for hydrocarbon elements in relation to the presence and effectiveness of those elements. In some aspects, the input parameters can also include subterranean depth ranges to be used, granularity factors (such as how many types of potential value indicators to be used in the prospective map, and the area encompassed by the data points), assumptions regarding minerals and chemical properties or compositions within the subterranean formation of interest, and other user-controllable parameters. The user input parameters can be entered through a user interface or entered through an electronic means, such as through a network connection or other entry means.

Input parameters 110 can include the geologic, e.g., stratigraphic, age range, granularity factors, and other user-provided assumptions. An AOI 120 allows the user to specify one or more areas or locations to be analyzed during the next execution of the fairway analysis system. It is possible to specify the whole globe to be AOI 120, such as when an underlying assumption or rule is changed and an update to many prospective maps is requested.

Within AOI 120, there can be additional details supplied from set of input parameters 110. These additional details can be entered by a user or received from a data source. Source presence 130 can provide information on the top age and bottom age of the subterranean formations in AOI 120, as well as the source facies and chance methodology to be used. Reservoir presence 132 has a similar set of parameters, for example, the top age and bottom age of the reservoir as well as the reservoir facies and a chance methodology to utilize. Seal presence 134 also has a similar set of parameters, for example, the top age and bottom age of the seal as well as the seal facies and a chance methodology to utilize.

Source effectiveness 140 can include input parameters relating to the source depth surface and to charge modeling, such as a maximum proven migration distance and a maximum potential migration distance. Reservoir effectiveness 142 can include parameters relating to the reservoir depth surface, the porosity-permeability cutoffs, and depth cutoffs. Seal effectiveness 144 can include parameters relating to the seal depth surface. Each of source presence 130, reservoir presence 132, seal presence 134, source effectiveness 140, reservoir effectiveness 142, and seal effectiveness 144 can include fewer and additional parameters than described herein. In addition, source presence 130, reservoir presence 132, seal presence 134, source effectiveness 140, reservoir effectiveness 142, and seal effectiveness 144 can be generated as part of the analysis process. For example, chance map stacking 201 of FIG. 2A demonstrates the reservoir presence maps being stacked to generate the overall presence map. The overall presence map, e.g., the stacked map, can be used as input into the final reservoir map, e.g., the prospective map.

Figure 2A:
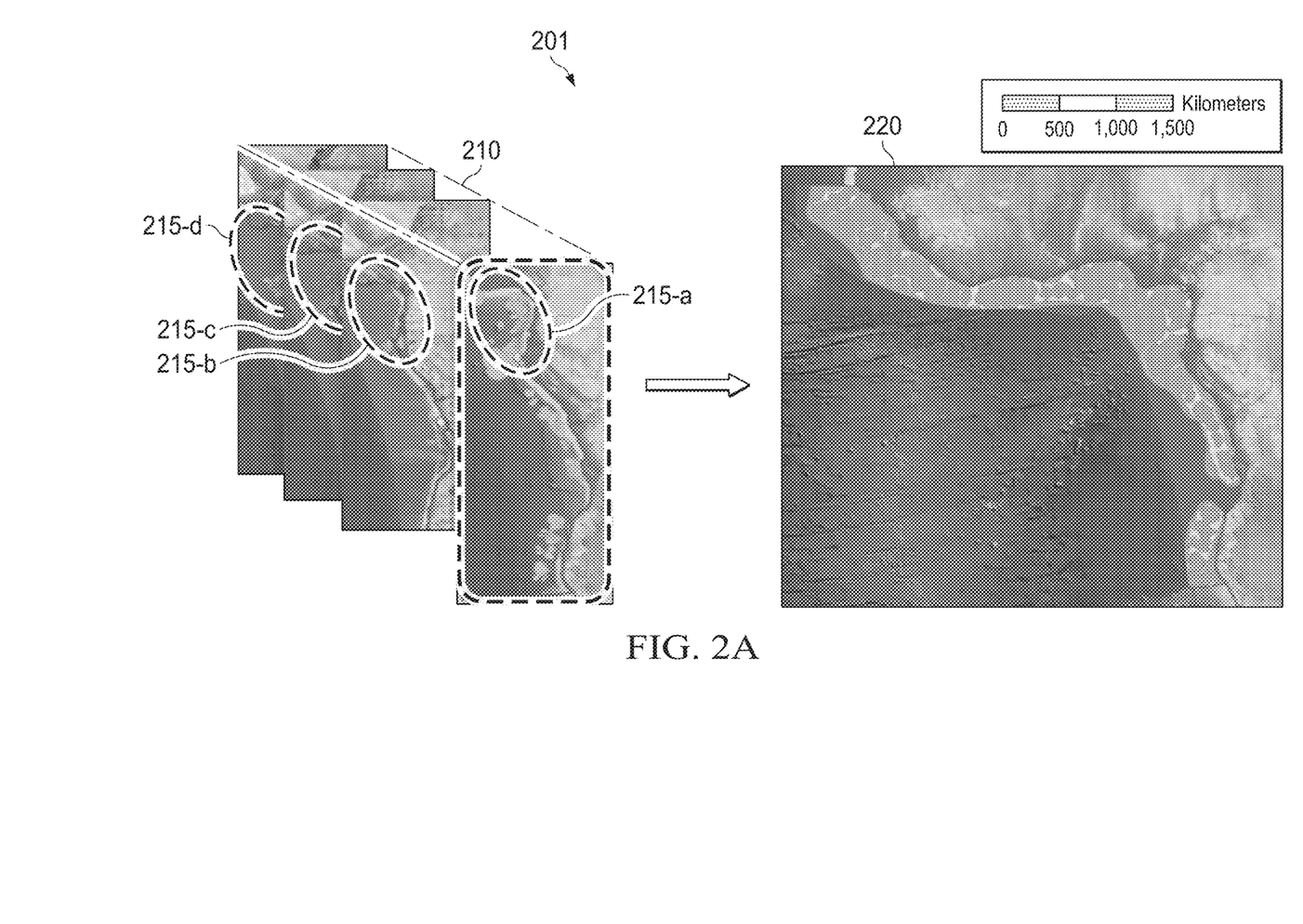
FIG. 2A is an illustration of a diagram of an example presence chance map stacking.

FIG. 2A is an illustration of a diagram of an example presence chance map stacking 201, including upscaling processing. After the input parameters are provided, such as described in set of input parameters 100, the fairway analysis system can receive the geological and stratigraphic data for the AOI and geological age range from a data source. The combined inputs can be geoprocessed through a series of algorithms that mimic geological principles, such as sequence stratigraphy. The geoprocessing can be implemented, for example, by fairway analysis system 400. The output of the geoprocessing process can be a series of generated chance maps 210 as shown by example in FIG. 2A, reservoir depth map 240, and reservoir effectiveness map 250 as shown by example in FIG. 2B.

The fairway analysis system can upscale multiple chance maps into one stacked map to indicate hydrocarbon element presence for an interval of time. This is shown using a visual 2D representation of the data using series of generated chance maps 210. Specified facies can be geoprocessed and ranked, following a rules base, to transform and amalgamate series of generated chance maps 210 into a chance map 220. In some aspects, chance map 220 can be represented by a 2D map with colors indicating the varying likelihoods of hydrocarbon elements being present at a specific location. In other aspects, chance map 220 can be represented by a set of data elements or symbols.

Highlight circle 215-*a*, highlight circle 215-*b*, highlight circle 215-*c*, and highlight circle 215-*d*, collectively identified as highlight circles 215, are highlighting a portion of each of the chance maps within series of generated chance maps 210. Highlight circles 215 generally correspond to the area shown in chance map 220.

Figure 2B:
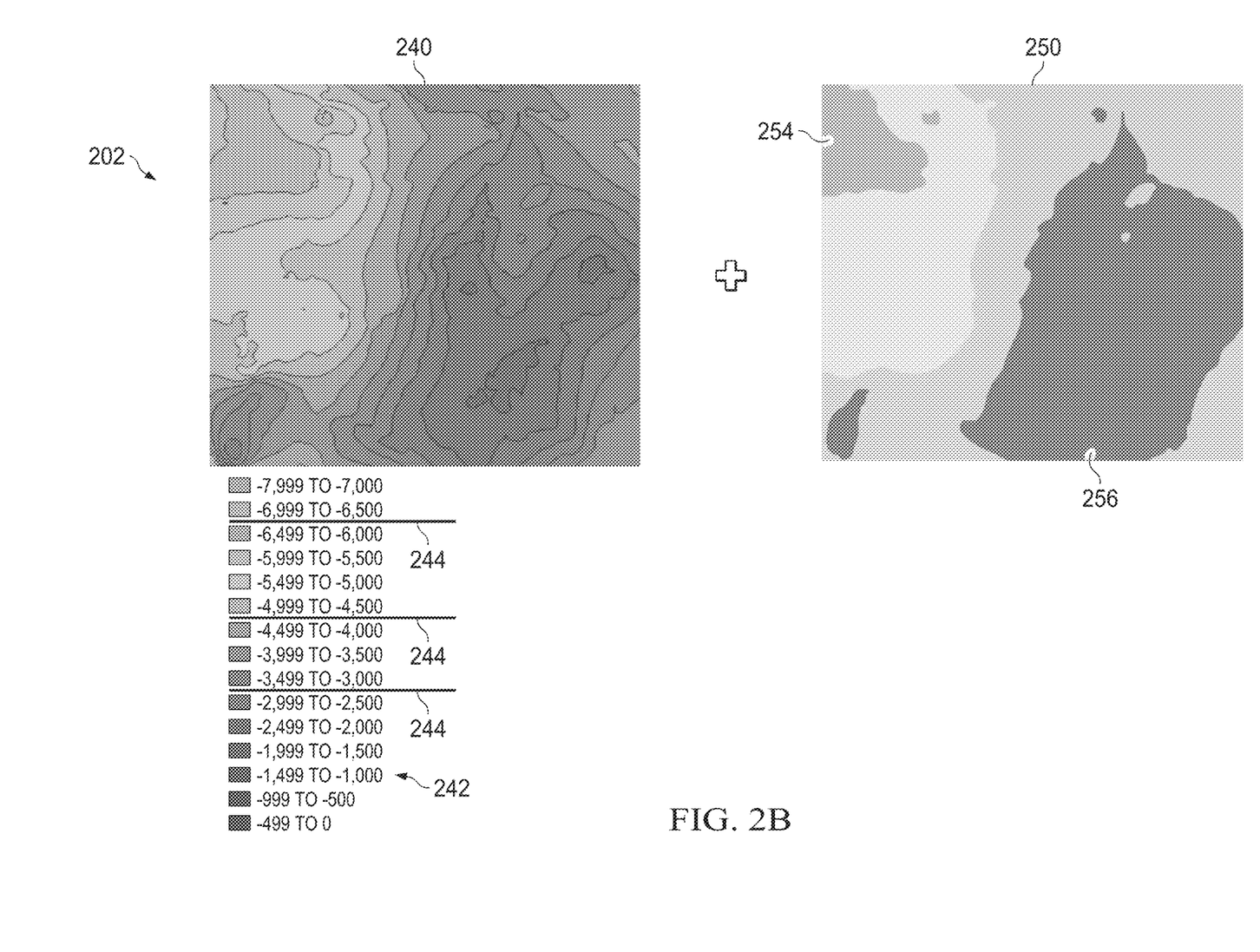
FIG. 2B is an illustration of a diagram of an example effectiveness synthetization.

FIG. 2B is an illustration of a diagram of an example effectiveness synthetization 202. Effectiveness synthetization 202 can be performed, for example, by fairway analysis system 400. The effectiveness of the hydrocarbon elements can be assessed through the fairway analysis process. Geological parameters can be intelligently extracted from relevant databases and upscaled to generate one or more reservoir depth map(s) 240 and generate one or more reservoir effectiveness map(s) 250. The geological parameters can include, for example, complex depth and temperature data sets.

Reservoir depth map 240 demonstrates geological data, as a set of depth contours, being synthesized with depth-cutoff values. A depth key 242 is shown for reservoir depth map 240. Depth key 242 indicates three depth cutoff values 244, such as being supplied as input parameters from a user, from a data source, from a default, or from a machine learning process. In this example, depth cutoff values 244 indicate depth cutoffs at 2,999 feet, 4,499 feet, and 6,499 feet.

Reservoir effectiveness map 250 is the same geographic location as reservoir depth map 240. This example is demonstrating an area 254 that is least likely to be effective and an area 256 that is most likely to be effective. Reservoir depth map 240 and reservoir effectiveness map 250 can be synthesized, e.g., combined using a geoprocessing algorithm, to generate an overall effectiveness chance map, e.g., a simple map depiction of effectiveness, that can be utilized in further analysis.

Effectiveness screening can include the generation of proxy maps, such as thermal maturity maps, kitchen maps, charge maps, reservoir effectiveness maps, and seal effectiveness maps. These proxy maps can utilize reservoir depth map 240 and reservoir effectiveness map 250. In some aspects, reservoir depth map 240 and reservoir effectiveness map 250 can be represented by colors to indicate the varying likelihoods of hydrocarbon elements being effective at specific locations and depths. In other aspects, reservoir depth map 240 and reservoir effectiveness map 250 can be represented by a set of data elements or symbols.

Figure 2C:
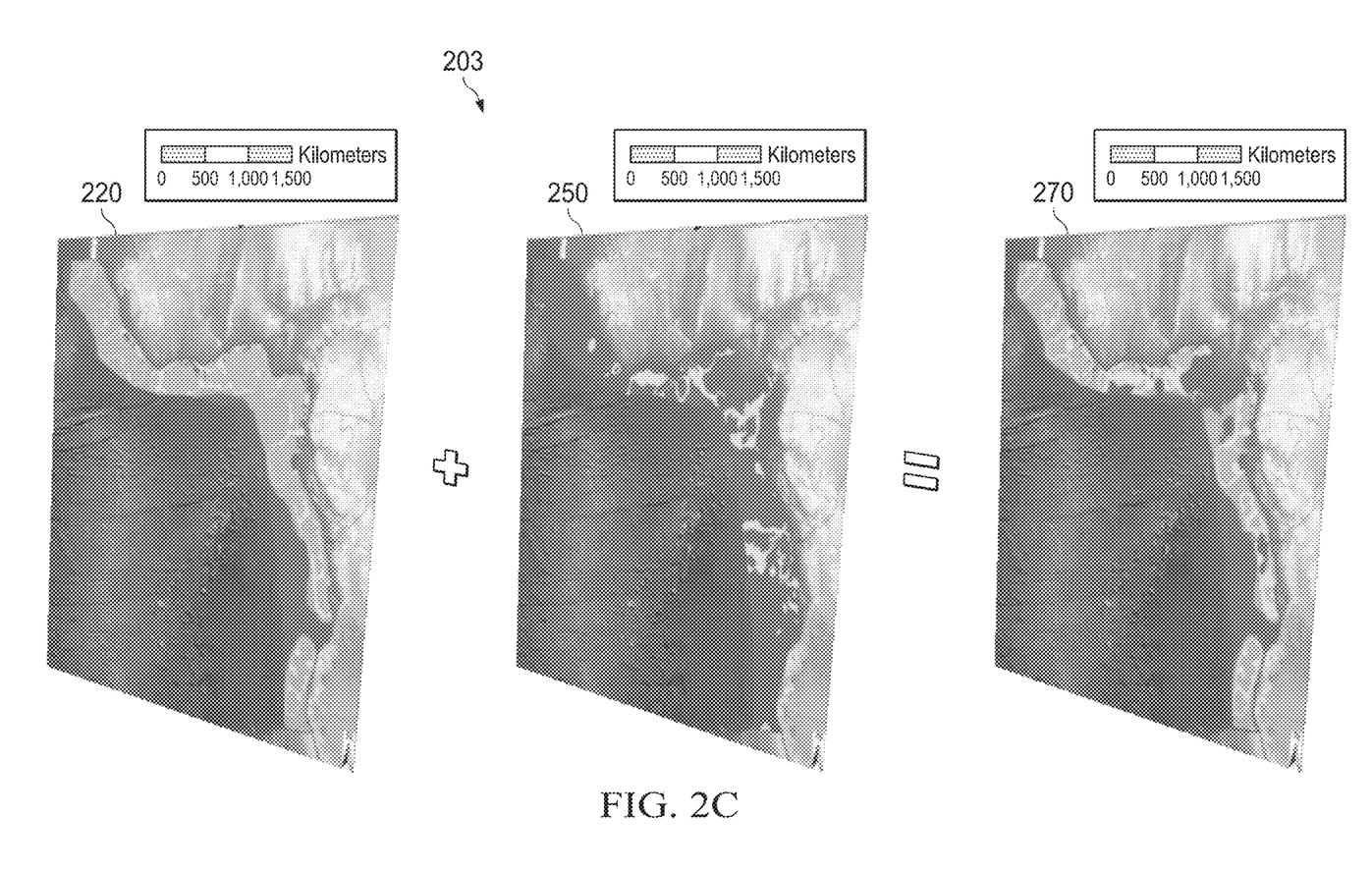
FIG. 2C is an illustration of a diagram of an example amalgamation of presence and effectiveness chance maps, building on FIGS. 2A and 2B.

FIG. 2C is an illustration of a diagram of an example amalgamation 203 of presence and effectiveness chance maps building on FIGS. 2A and 2B. Amalgamation 203 can be performed, for example, by fairway analysis system 400. The next step of the fairway analysis can be an amalgamation and intelligent stacking of the presence maps and effectiveness maps to produce combined chance maps. The combined chance maps can reflect the cumulative chance of the hydrocarbon elements that have been screened being present and effective at any given location. In some aspects, the combined chance maps can be represented by colors indicating the potential value in exploring the AOI. In other aspects, the combined chance map can be represented by a set of data or by symbols.

Amalgamation 203 demonstrates chance map 220, indicating the overall reservoir presence likelihood, can be combined with reservoir effectiveness map 250, indicating the overall effectiveness likelihood, to produce a prospective reservoir map 270. For example, one algorithm that can be used by the geoprocessing process is to combine multiple chance maps and effectiveness maps and the lowest chance element can be propagated through to the surface, therefore reducing the prospective areas. Other algorithms can utilize an average, weighted average, mean, or other algorithm to combine the various maps. In this example, the areas indicated as more likely can reflect where the hydrocarbon elements are likely to be present and effective in the subterranean formation AOI.

Figure 3:
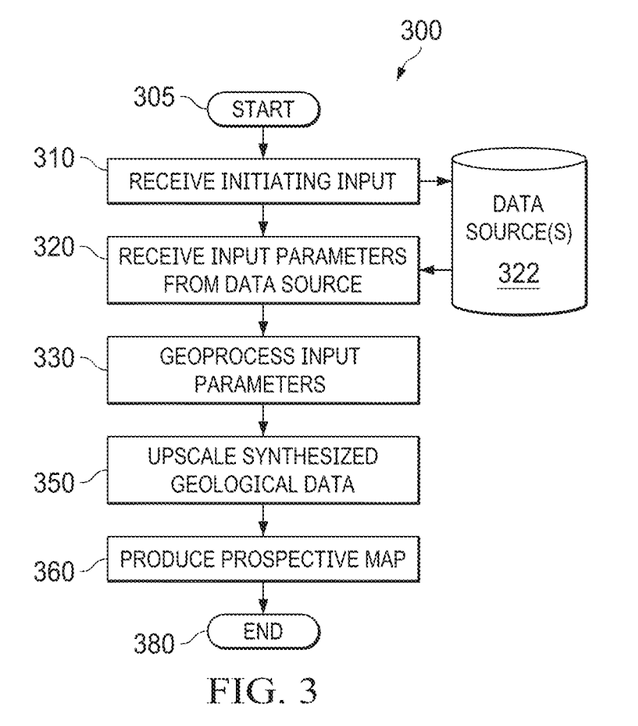
FIG. 3 is an illustration of a flow diagram of an example method to automate a fairway analysis process.
Figure 5:
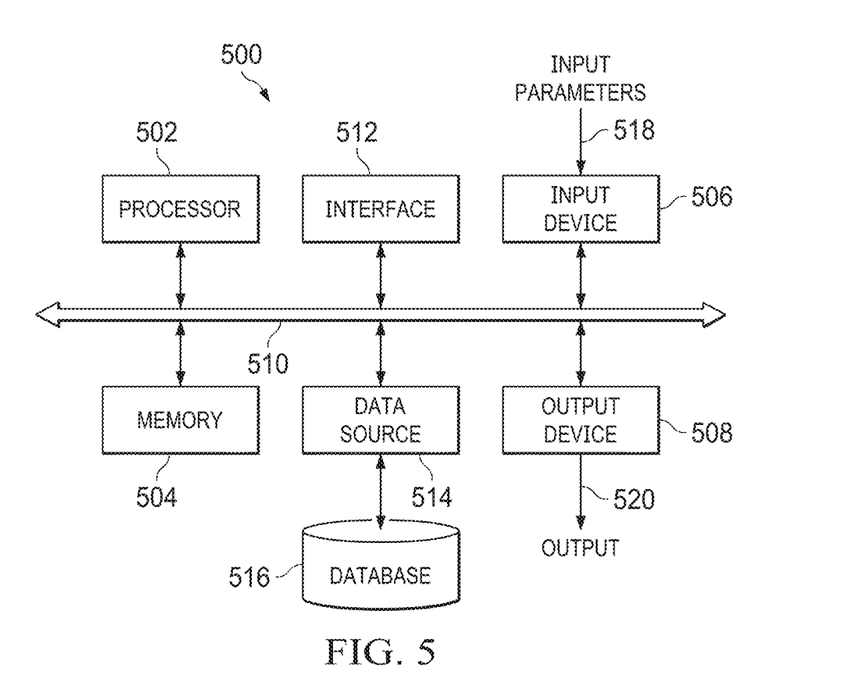
FIG. 5 is an illustration of a block diagram of an example computing system configured to perform fairway analysis.

FIG. 3 is an illustration of a flow diagram of an example method 300 to automate a fairway analysis process. Method 300 can be used to reduce user bias, reduce user estimations, and reduce uncertainties introduced with user assumptions when executing a fairway analysis of an AOI. Method 300 can be performed by fairway analysis system 400 executing, for example, on computing system 500.

Method 300 starts at a step 305 and proceeds to a step 310. In step 310, user input parameters can be received. User input parameters can specify a geological age range and an AOI. In addition, the user can specify granularity of the results in terms of how small an area is represented by a data point and the number of differing levels of the data points on the map, e.g., high-medium-low, 1-5, a six level scheme using colors, and other data representations and number of granular levels. In some aspects, the user can specify presence, effectiveness, and seal parameters as shown in set of input parameters 100.

Using the input parameters from step 310, a step 320 can receive subterranean formation input parameters, such as rock composition data, rock depth data, geochemistry data, and other parameters of the AOI. In some aspects, these input parameters can be received from a step 322 which can utilize the input parameters from step 310 to gather relevant data. The relevant data can be sourced from one or more data sources, for example, a GDE source, a well data source, a geochemistry data source, a rock property data source, a depth data source, and other data sources and databases.

Proceeding to a step 330, the user-provided input parameters and the data source provided input parameters can be geoprocessed to generate synthesized geological data. Geoprocessing can use conventional stratification frameworks and algorithms to process the input parameters, such as sequence and ordered stratification frameworks. The geoprocessing can automatically determine the rules and algorithms to utilize as well as the sequence of the rules and algorithms to apply. This analysis can include sequencing the age-aware rules to apply utilizing a stratigraphic analysis, and sequencing the processing algorithms using an ordered sequence stratigraphic framework and the synthesized geological data. In some aspects, the user can specify a sequence of some or all of the rules and algorithms. In some aspects, some of the rules, algorithms and sequencing, can be specified by a machine learning algorithm, where the machine learning outputs new input parameters that override or complement a user input thereby enabling a more consistent application of the geoprocessing process. For example, rules can be applied to estimate sediment changes over time at times between high and low global sea levels, when a high sea level parameter and a low sea level parameter are known.

Proceeding to a step 350, the geoprocessed input parameters, i.e., synthesized geological data, can be upscaled. The upscaling of the synthesized geological data can utilize the specified geological age range to generate chance maps that indicate presence likelihoods and effectiveness likelihoods.

Proceeding to a step 360, a prospective map can be produced utilizing the upscaled synthesized geological data. Various algorithms can be utilized to combine the data from the chance maps. For example, the presence chance maps for each of the analyzed hydrocarbon elements can be stacked and sorted so that the lowest chance representation is on top. The chance maps on top of each stack (representing a hydrocarbon element) can be overlaid with an averaging of the likelihood values from each top level chance map. Then the effectiveness chance map can be overlaid with the depth data weighting the presence likelihoods so that a prospective map is produced showing the likelihood of success of further exploration in that AOI. Other algorithms can be used in the amalgamation of the two or more chance maps utilizing the synthesized geological data, such as weighting the presence chance maps to certain hydrocarbon elements, averaging or using a mean of the presence chance maps likelihoods, and other algorithms. Proceeding from step 360, method 300 ends at a step 380.

FIG. 4 is an illustration of a block diagram of an example fairway analysis system 400, that can be utilized to implement the processes described herein, such as method 300. Fairway analysis system 400 can be implemented on various computing systems, for example, computing system 500 of FIG. 5. Fairway analysis system 400 includes a fairway analyzer 410. Fairway analyzer 410 further includes a geological data receiver 420 and a stratigraphic analyzer 430. In some aspects, a machine learning processor 435 can be part of fairway analyzer 410.

Geological data receiver 420 can receive input parameters, such as entered by a user, received from a data source, or received from another system such as through an electronic wired or wireless connection, for example, a network, intranet, or internet connection. Geological data receiver 420 can receive the initial user provided input parameters and send a request to a data source for the geological and subterranean data that is appropriate for the AOI and the specified geological age range. The geological and subterranean formation data can be communicated to geological data receiver 420 as additional input parameters.

Geological data receiver 420 can provide the initial and additional received input parameters to stratigraphic analyzer 430 for further processing. Stratigraphic analyzer 430 can perform the sequencing and ordering of the age-aware rules and algorithms, geoprocessing of the input parameters to generate the synthesized geological data, upscaling of the synthesized geological data, and generating and producing the intermediate, proxy, and final chance maps and prospective map. Stratigraphic analyzer 430 can utilize various amalgamating, combining, and estimating algorithms to perform its tasks.

In some aspects, machine learning processor 435 can be communicatively coupled to stratigraphic analyzer 430 and utilized to provide estimations and assumptions to stratigraphic analyzer 430 as new input parameters, for example, determining subterranean formation depth ranges—bypassing, e.g., overriding or complementing, user input parameters. Machine learning processor 435 can reduce bias and uncertainty by applying consistent rules algorithms to determining some of the parameters used by stratigraphic analyzer 430. In some aspects, machine learning processor 435 can also be used to upscale input parameters, prior to being used by stratigraphic analyzer 430. Machine learning processor 435 can be various types of machine learning processors and deep learning neural networks.

Stratigraphic analyzer 430 can output the one or more generated presence and effectiveness chance maps, such as the intermediate and proxy maps, as well as the prospective map for the AOI. In some aspects, the output can be a set of data elements that can be utilized by another computing system. The prospective map can be communicated to a user, such as on a display, monitor, or printer, and communicated to another system, computing system, networked device, or storage, such as a hard disk, cloud environment, server, or data center. In some aspects, fairway analyzer 410 can also be implemented to update the prospective map automatically when input parameters change, such as when an underlying assumption of mineralogy or chemical properties change, or if a technological advancement changes the ease of extraction or production factors for a particular hydrocarbon element or type of surface and subterranean geology of the AOI.

FIG. 5 is an illustration of a block diagram of an example computing system 500 configured to perform fairway analysis in which the above illustrated aspects can be implemented, such as fairway analysis system 400.

Computing system 500 generally consists of at least one processor 502, or processing unit or plurality of processors, memory 504, at least one input device 506 and at least one output device 508, coupled together via a bus or group of buses 510. In some aspects, input device 506 and output device 508 can be the same device. An interface 512 can also be provided for coupling computing system 500 to one or more peripheral devices, for example interface 512 could be a PCI card, PC card, network, wireless transceiver, and other types of interfaces. At least one storage device 514 which is coupled to one or more databases 516 can also be provided. Memory 504 can be any form of memory device, for example, volatile or non-volatile memory, solid state storage devices, magnetic devices, and other memory types.

Input device 506 receives input parameters 518 and can comprise, for example, a keyboard, a pointer device such as a pen-like device or a mouse, audio receiving device for voice-controlled activation such as a microphone, data receiver or antenna such as a modem or wireless data adaptor, data acquisition card, and other input devices and methods. Input parameters 518 can come from different sources, for example keyboard instructions for user specified input parameters, and data received via a network for GDE input parameters.

Processor 502 can comprise more than one distinct processing device, for example to handle different functions within computing system 500. Processor 502 can execute, in conjunction with memory 504 and data source 514, the functionality as described in fairway analyzer 410, geological data receiver 420, and stratigraphic analyzer 430, as well as machine learning processor 435.

Output device 508 produces or generates output 520, for example, the chance maps and the prospective map. Output device 508 can comprise, for example, a display device or monitor in which case output 520 is visual, a printer in which case output 520 is printed, a port for example a USB port, a peripheral component adaptor, a data transmitter or antenna such as a modem or wireless network adaptor, and other types of output devices such that output 520 can be communicated to another internal or external computing system. Output 520 can be distinct and derived from different output devices, for example a visual display on a monitor in conjunction with data transmitted to a network. A user could view data output, such as displaying the prospective map in a 2D color rendering identifying the likelihood of exploration success, or output 520 can be a set of output data that can be communicated to another system for further processing. Storage device 514 can be any form of data or information storage means, for example, volatile or non-volatile memory, solid state storage devices, magnetic devices, and other storage device types.

Computing system 500 is adapted to allow data or information to be stored in and retrieved from database 516, via wired or wireless communication means. Interface 512 can allow wired or wireless communication between processor 502 and peripheral components that may serve a specialized purpose. For example, interface 512 can communicate with a data source, such as a GDE or well data, to retrieve appropriate AOI data as additional input data according to the initial input data received. Preferably, processor 502 receives instructions as input parameters 518 via input device 506 and can display processed results or other output to a user by utilizing output device 508. More than one input device 506 and output device 508 can be provided. Computing system 500 can be any form of terminal, server, specialized hardware, tablet, smartphone, laptop, cloud processing environment, and other computing systems located proximate a user or located in a data center, cloud environment, or another location.

Computing system 500 can be a part of a networked communications system. Computing system 500 can connect to a network, for example, the Internet or a WAN. Input parameters 518 and output 520 can be communicated to other devices via the network.

The logical connections depicted in FIG. 5 include a local area network (LAN) and a wide area network (WAN), but may also include other networks such as a personal area network (PAN). For example, when used in a LAN networking environment, computing system 500 can be connected to the LAN through a network interface or adapter. When used in a WAN networking environment, computing system 500 typically includes a modem or other means for establishing communications over the WAN, such as the Internet. The modem, which may be internal or external, may be connected to a system bus via a user input interface, or via another appropriate mechanism.

In a networked environment, program modules depicted relative to computing system 500, or portions thereof, may be stored in a remote memory storage device. The illustrated network connections and group of buses 510 connections are exemplary and other means of establishing a communications link between multiple components and computers can be used. The components shown of computing system 500 are an example of a logical separation of functions and the components can be combined and separated in various combinations in practice, for example, interface 512 and input device 506 can be the same component.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method to perform fairway analysis on a computing system, comprising:
    geoprocessing received input parameters, wherein the geoprocessing utilizes a sequence of age-aware rules and a sequence of algorithms to generate synthesized geological data, where initial input parameters are received from a user and include an area of interest (AOI) and a geological age range, and the input parameters are received from a data source utilizing the initial input parameters;
    upscaling the synthesized geological data over a geological age range utilizing a computing system implementing a stratigraphic analyzer; and
    producing a prospective map by amalgamating one or more generated chance maps, where the one or more generated chance maps specify a presence of hydrocarbon elements and an effectiveness of hydrocarbon elements, and are generated utilizing the synthesized geological data, wherein the sequence of algorithms utilizes a stratigraphic framework that is one or more of a sequence stratigraphic framework, a chronostratigraphic framework, or a lithostratigraphic framework.

2. The method as recited in claim 1, wherein the one or more generated chance maps include one or more of stacked gross depositional environment (GDE) maps, element presence maps, thermal maturity maps, kitchen maps, charge maps, and reservoir effectiveness maps.

3. The method as recited in claim 1, further comprising:
    estimating sediment between a high sea level parameter and a low sea level parameter utilizing the sequence of age-aware rules with the sequence of algorithms.

4. The method as recited in claim 1, further comprising:
    sequencing the sequence of age-aware rules utilizing a stratigraphic analysis.

5. The method as recited in claim 1, wherein the initial input parameters include at least one or more geological age ranges, one or more areas of interest, one or more lithologies of interest, and a methodology utilized for generating the prospective map.

6. The method as recited in claim 5, wherein the received input parameters are received from one or more of GDE, well data source, geochemistry data source, rock property data source, and rock depth data source.

7. The method as recited in claim 5, wherein the received input parameters include user input parameters.

8. The method as recited in claim 1, wherein the received input parameters include a list of potential algorithms that are utilized by the geoprocessing of the received input parameters.

9. The method as recited in claim 1, wherein the stratigraphic framework utilizes a prediction of locations of subterranean formations.

10. The method as recited in claim 1, further comprising:
    updating the prospective map automatically when the received input parameters are changed.

11. A system to perform fairway analysis, comprising:
    a geological data receiver, capable of receiving input parameters from one or more data databases and one or more user input parameters, wherein the one or more user input parameters are received from a user and include at least an area of interest (AOI) or a geological age range; and
    a processor including a stratigraphic analyzer, capable of geoprocessing the input parameters, wherein the geoprocessing uses a stratigraphic framework, geological principles, and geological age-aware rules to create synthesized geological data, upscaling the synthesized geological data, and generating one or more chance maps and prospective maps utilizing the synthesized geological data, wherein the stratigraphic framework is one or more of a sequence stratigraphic framework, a chronostratigraphic framework, or a lithostratigraphic framework, and where the one or more chance maps specify a presence of hydrocarbon elements and an effectiveness of hydrocarbon elements.

12. The system as recited in claim 11, further comprising:
    a machine learning processor, capable of overriding the input parameters with new input parameters, upscaling the new input parameters prior to being utilized by the stratigraphic analyzer, and determining subterranean formation depth ranges utilized by the stratigraphic analyzer.

13. The system as recited in claim 11, wherein the one or more data sources include gross depositional environment (GDE) source, well data source, geochemistry data source, rock property data source, and rock depth data source.

14. The system as recited in claim 11, wherein the chance maps utilize one or more of a thermal maturity map, one or more of a kitchen map, one or more of a charge map, one or more of a reservoir map, and one or more of a seal effectiveness map.

15. A computer program product having a series of operating instructions stored on a non-transitory computer-readable medium that directs a data processing apparatus when executed thereby to perform fairway analysis operations, the operations comprising:

geoprocessing received input parameters, wherein the geoprocessing utilizes a sequence of age-aware rules and a sequence of algorithms to generate synthesized geological data where initial input parameters are received from a user and include an area of interest (AOI) and a geological age range, and the input parameters are received from a data source utilizing the initial input parameters;

upscaling the synthesized geological data over a geological age range utilizing a computing system implementing a stratigraphic analyzer; and producing a prospective map by amalgamating one or more generated chance maps, where the one or more generated chance maps specify a presence of hydrocarbon elements and an effectiveness of hydrocarbon elements, and are generated utilizing the synthesized geological data, wherein the sequence of algorithms utilizes a stratigraphic framework that is one or more of a sequence stratigraphic framework, a chronostratigraphic framework, or a lithostratigraphic framework.

16. The computer program product as recited in claim 15, further comprising: receiving a portion of the received input parameters from a machine learning algorithm.

\* \* \* \* \*